United States Patent [19]
Schubach

[11] 3,827,137
[45] Aug. 6, 1974

[54] METHOD OF ASSEMBLING A VEHICLE ROOF AND SIDEWALL ON A COMPLETED BASE BY EXTERNAL JOINT STRUCTURES

[75] Inventor: Theodor C. Schubach, Bonita, Calif.
[73] Assignee: Rohr Industries, Inc., Chula Vista, Calif.
[22] Filed: Mar. 1, 1972
[21] Appl. No.: 230,689

[52] U.S. Cl............... 29/469, 29/509, 29/522, 296/28 R, 296/137 R
[51] Int. Cl............................................. B23p 21/00
[58] Field of Search.............. 29/469, 509, 522; 296/28 R, 137 R; 52/56

[56] References Cited
UNITED STATES PATENTS
2,209,563  7/1940  Deisley.................. 296/137 R X
2,271,649  2/1942  Komenda..................... 296/28 R
3,148,481  9/1964  Swann.......................... 52/56 X Primary Examiner—Charlie T. Moon

[57] ABSTRACT

The roof structure of a ground transportation vehicle is manufactured as a unit, complete with all components, accessories, finish and trim, as are also each of the vehicle sidewalls, including the seats, which preferably are cantilever or semi-cantilever type. The completed roof structure and walls are then assembled and secured, by externally applied fastenings, in permanently interconnected relation on a base structure which has a finished floor covering laid thereon, so that the interior of the vehicle is then complete, or virtually complete.

2 Claims, 2 Drawing Figures 3,827,137

METHOD OF ASSEMBLING A VEHICLE ROOF AND SIDEWALL ON A COMPLETED BASE BY EXTERNAL JOINT STRUCTURES

BACKGROUND OF THE INVENTION

In the past, in making a transportation type vehicle such as a bus, or a car for a mass transportation system, it has been customary to erect on a partly completed chassis or base structure the frame structure or shell for the side walls and roof of the vehicle, which is then completed by the installation of electrical wiring, air conditioning equipment, heating and cooling ducts, fixtures, trim, sets, floor covering, etc. Such "stick type" construction is slow and costly, with artisans of various trades working interiorly of the car from the time the side wall and roof frames or shells are erected on the base structure until the final interior decoration is completed and the floor covering laid. Such work is difficult to plan, schedule, supervise, and perform, and there is a constant possibility that one or another crew of workers may damage or soil work already performed, thereby causing duplication and delay and adding to cost.

PURPOSE OF THE INVENTION

A primary objective of the present invention is to provide an improved structure and method for manufacturing a transportation type vehicle, wherein finished roof structure and side walls, with all assemblies, components and accessories installed therein and interior finish applied, are each manufactured to finished form in individual jigs, which are positioned for maximum worker accessibility and efficiency. The completely finished roof structure and sidewalls are then removed from their respective jigs, and are interlocked and permanently secured in substantially unitary relation on a usual car base structure, whereupon the interior of the vehicle is completed, or substantially so.

BRIEF DESCRIPTION OF THE DRAWINGS

The foregoing objectives of the invention will be apparent from the following description and the accompanying drawings, wherein.

DETAILED DESCRIPTION OF THE DRAWINGS

Figure 1:
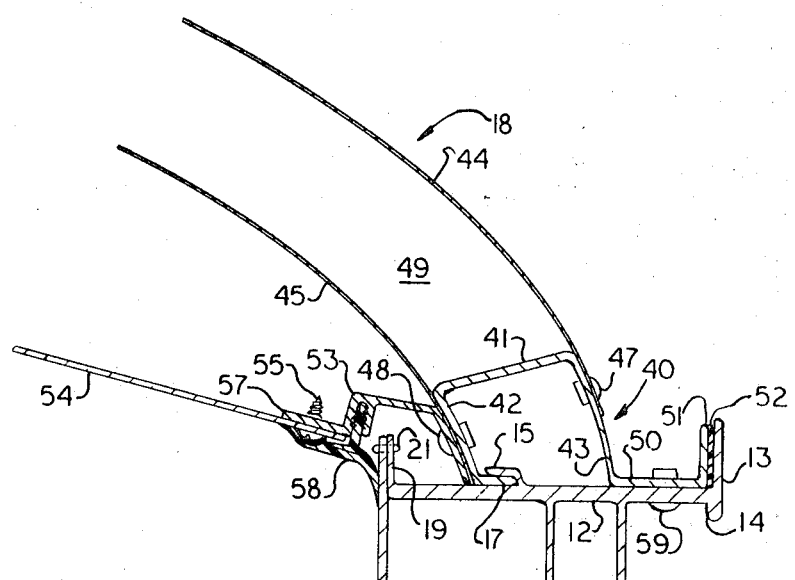
FIG. 1 is a fragmentary, vertical transverse, sectional view of the roof-to-sidewall joint area of a vehicle made in accordance with the present invention.

Referring to the drawing in detail, the upper portion of the side wall 10 of a transportation type vehicle A, such as a bus, or a car for a mass transit railway system, comprises an extrusion 11, which, like other extrusions illustrated, may be of aluminum. The extrusion 11 has a horizontal top plate portion 12 with an integral, upturned flange 13 on its laterally outer end, and a drip bead 14 therebeneath. A locking flange 15, for interlocking engagement with a flange 17 of a roof structure 18, is also integral with the extrusion top plate portion 12, as is also an upturned flange 19 provided along the inner edge of such top plate portion 12.

A wall lining plate 20 has its upper edge attached, as by rivets 21, to the inner extrusion flange 19, and the lower portion of this lining plate 20 is bent angularly outwardly at 22, and its lower edge secured as by self tapping screws 23 to an extrusion 24, which in turn is secured by rivets 25 to an angle flange 26 integral with the lower portion of the first mentioned extrusion 11.

A window frame 27 of suitable type may be of molded rubber or plastic, with exterior grooves 28 and 29 therein which receive the lower edges of the extrusions 11 and 24, respectively. The window frame 27 has also an inner groove 30, into which is fitted a channel member 31 of suitable material, and double window panes 32 and 33 are in turn fitted into grooves provided in a marginal seal 34, which is fitted into the channel member 31 in a manner which will be apparent to those familiar with current practice in this field.

The vehicle roof structure 18 comprises an extrusion 40 along each side thereof with an inverted channel portion 41, the side walls 42 and 43 of which conform, respectively, to the curvature of an outer roof sheet 44, and a roof liner sheet 45 spaced inwardly therefrom. The roof sheet 44 and liner 45 are secured to the sides of the channel portion 41 by rows of rivets 47 and 48, respectively. The space 49 between the roof sheet 44 and liner 45 is filled with suitable structural insulative material, not shown, such as, for example, plastic foam.

The vehicle side walls, and the roof structure 18, have all specified accessories, equipment, ducts, fixtures, trim, etc. installed therein and finish applied thereto during manufacture in their respective jigs, not shown, which may be of any suitable or conventional type, so that they are completely finished prior to assembly with each other and with a suitable, conventional base structure to be referred to later herein.

The interlocking roof flange 17, mentioned previously herein, extends outwardly from the lower edge of the channel inner wall 42, which it is integral, and a second integral flange 50 also extends horizontally outwardly from the lower edge of the outer channel wall 43 and is supported in conforming relation on the top plate portion 12 of the first mentioned extrusion 11. An integral upturned flange 51 at the outer edge of the horizontal roof flange 50 is of substantially the same height as the upright flange 13 on the outer edge of the extrusion top plate portion 12, and is sealed thereto by a suitable sealant 52.

A ceiling support extrusion 53 is secured by the previously mentioned rivets 48 to the inner wall 42 of the extrusion channel portion 41, with the roof liner sheet 45 interposed therebetween, and a ceiling lining sheet 54 is attached by sheet metal screws 55 to an integral flange 57 provided on the inner edge of the roof extrusion 53. An inverted T shape seal 58 of suitable resilient material, such as rubber or plastic, has the portion thereof representing the stem portion of the T thereof fitted securely into a channel provided therefor in the ceiling support extrusion 53. The outer portion of the head of the T shape seal 58 is curved downwardly and seats resiliently against the wall lining plate 20 when the parts are in their assembled, solid line position of FIG. 1.

Figure 2:
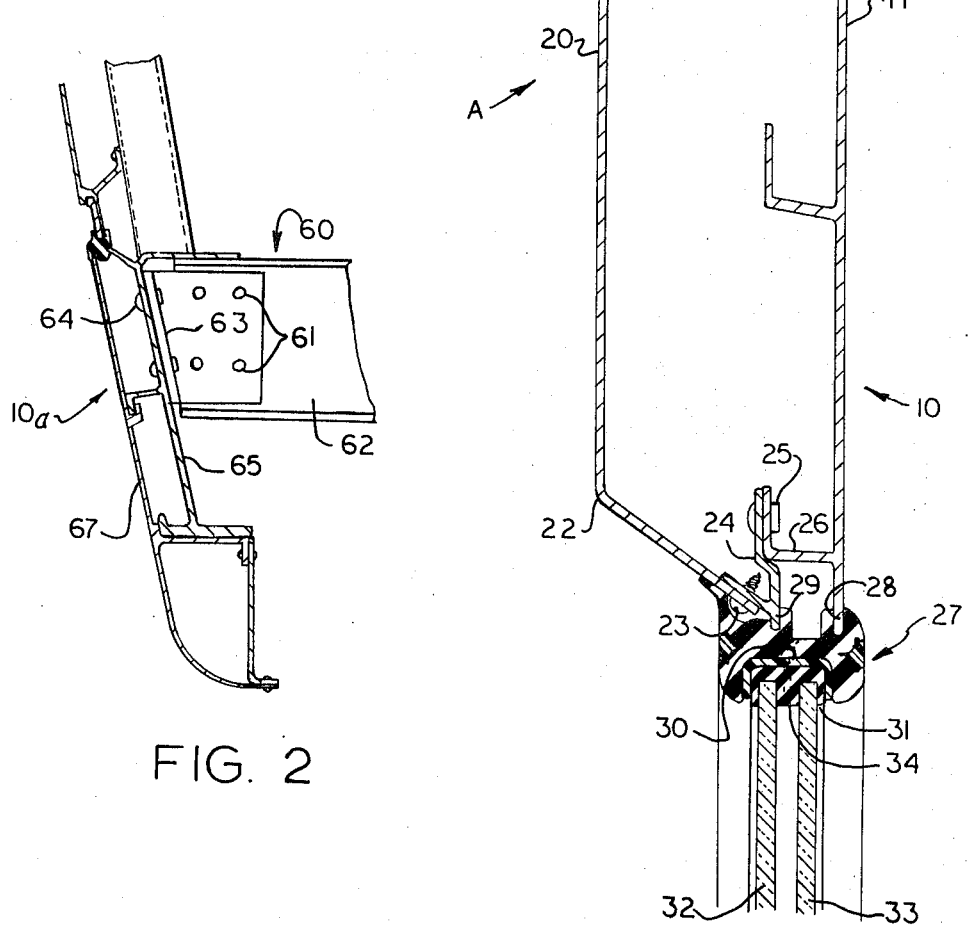
FIG. 2 is a similar view, but in reduced scale, of the wall-to-base structure joint area on the opposite side of such vehicle.

The bottom of each completed wall structure 10 also is preferably secured to a usual vehicle base structure 60 by a joint structure completed by workers working exteriorly of the vehicle. The illustrative bottom joint structure, see FIG. 2, comprises a pair of angle plates 63 attached, as by rivets 61, to each end of each of the usual floor beams 62 of the vehicle base structure. Rivets 64 secure the angle plates 61 to an extrusion 65 comprising the lower portion of each side wall as shown in FIG. 2. A cover plate 67, flush with the outer surfaces of the lower side wall 10a is mounted over the riveted side wall to base structure joint thus formed to cover and conceal the joint and to provide a substantially continuous exterior surface for this portion of the vehicle body.

OPERATION

Although the sequence of assembly of the roof structure, side walls and base structure is not necessarily fixed, it is preferred at present to first assemble the roof structure 18 and side walls 10 and 10a in their completed, finished form. In thus assembling the individually completed roof structure and side walls, the latter are erected and the roof structure 18 is lowered onto the walls and is interlocked thereto by moving the side walls relatively to the roof structure to bring each flange 17 to interlocked position beneath its respective flange 15. Rivet holes are punched in the superposed flanges 12 and 50, and rivets 59 are inserted in these holes and set by workers working exteriorly of the vehicle, thus permanently securing the walls and preventing relative displacement therebetween. The space between the upstanding flanges 13 and 51 is sealed with a suitable sealant 52.

The lower ends of the vehicle side walls, as shown by the wall 10a of FIG. 2, are then fitted to and secured by the rivets 64 to a vehicle base structure 60 as shown. The base structure employed preferably has a usual floor covering, not shown, applied thereto prior to assembly with the side walls so that it is unnecessary after such assembly to perform any further work inside the vehicle, or even to have any workmen enter the car.

The vehicle end portions, not shown, may be completed and attached to the assembled base structure, walls and roof structure in any suitable or well known manner. However, the end portions of such vehicles may be manufactured in widely different ways, and since such manufacture, and the assembly of such end portions with the remainder of the vehicle are not features of the present invention, they are not shown or described herein.

The invention provides a simple, fast, efficient, economical, solution to a problem which has existed up to the present time in the manufacture of vehicles of the type referred to, wherein installers of lighting fixtures, air conditioning equipment and seats, painters, and others work in cramped quarters with their paint, adhesives and other materials, and power tools with their hoses and extension cords strung here and there, all detrimental to workmanlike performance and potentially hazardous to work already completed.

Thus, by means of this invention, low cost labor areas are used with minimum freight penalty, and the facilities for, and operations connected with, final assembly are minimized.

Having thus described my invention, what I claim as new and useful and desire to protect by U.S. Letters Patent is:

1. The method of making a transportation type vehicle comprising a base structure, a pair of sidewalls and a roof structure, which method comprises, providing an externally exposed joint structure along each side of the roof structure, providing an externally exposed joint structure along the upper end of each vehicle sidewall for interfitting, supporting relation with the externally exposed joint structure formed along the corresponding side of the roof structure, providing an externally exposed joint structure along each side of the base structure, providing an externally exposed joint structure along the lower portion of each sidewall for interfitting relation with the externally exposed joint structure provided along the corresponding side of the base structure, completing the roof structure and both of the sidewalls to substantially finished form, erecting the sidewalls on the base structure with their respective externally exposed joint structures in interfitted relation, securing together the externally exposed sidewall-to-base structure joint structures by workers working exteriorly of the vehicle, mounting the roof structure on the sidewalls with their respective externally exposed joint structures in interfitted relation, and securing together the externally exposed sidewall-to-roof-to-base structure joint structures by workers working exteriorly of the vehicle.

2. The method of making a transportation type vehicle as defined in claim 1 wherein a row of rivets is inserted in holes provided in interfitting portions of the side wall and base structure comprising each base-to-side wall joint, both ends of the rivets being exposed externally of the vehicle, and the rivets are set by workers working exteriorly of the vehicle.

* * * * *